(12) United States Patent
Okada et al.

(10) Patent No.: US 8,040,230 B2
(45) Date of Patent: Oct. 18, 2011

(54) ALARM CONTROL APPARATUS

(75) Inventors: Satoshi Okada, Tokyo (JP); Ryotatsu Iga, Tokyo (JP)

(73) Assignee: Yokogawa Electric Corporation, Musashino-Shi, Tokyo (JP)

(*) Notice: Subject to any disclaimer, the term of this patent is extended or adjusted under 35 U.S.C. 154(b) by 736 days.

(21) Appl. No.: 11/418,929

(22) Filed: May 4, 2006

(65) Prior Publication Data

US 2006/0273892 A1    Dec. 7, 2006

(30) Foreign Application Priority Data

May 11, 2005 (JP) ................. 2005-138582

(51) Int. Cl.
*G08B 21/00* (2006.01)
(52) U.S. Cl. ........................ 340/506; 340/521
(58) Field of Classification Search .............. 340/3.1, 340/506, 517, 521–523
See application file for complete search history.

(56) References Cited

U.S. PATENT DOCUMENTS

| | | | |
|---|---|---|---|
| 6,690,274 B1* | 2/2004 | Bristol | 340/506 |
| 7,113,085 B2 | 9/2006 | Havekost | |
| 2005/0062598 A1* | 3/2005 | Akamatsu et al. | 340/506 |

FOREIGN PATENT DOCUMENTS

| | | |
|---|---|---|
| JP | 03-044797 A | 2/1991 |
| JP | 3044797 A | 2/1991 |
| JP | 6176285 A | 6/1994 |
| JP | 9054614 A | 2/1997 |
| JP | 10240341 A | 9/1998 |
| JP | 2003-5830 A | 1/2003 |
| JP | 2003058967 A | 2/2003 |
| JP | 2003186536 A | 7/2003 |
| JP | 2003264639 A | 9/2003 |
| JP | 2004318641 A | 11/2004 |
| JP | 2005-84774 | 3/2005 |

OTHER PUBLICATIONS

Japanese Office Action dated Nov. 1, 2010, issued in corresponding Japanese Patent Application No. 2005-138582.
Japanese Office Action dated Nov. 10, 2009, issued in corresponding Japanese Patent Application No. 2005-138582.

* cited by examiner

*Primary Examiner* — Jeffery Hofsass
(74) *Attorney, Agent, or Firm* — Westerman, Hattori, Daniels & Adrian, LLP

(57) ABSTRACT

An alarm control apparatus which collects alarms from a plant and handles the alarms includes: a defining section for defining a conditioning process which is executed when performing a filtering process on the alarms; and a filtering section for performing the filtering process on the collected alarms in accordance with the conditioning process defined by the defining section.

6 Claims, 6 Drawing Sheets

FIG. 2

CONTENTS OF ALARMS

| ALARM | TAG NAME | MESSAGE TYPE | SIGNIFICANCE | BODY TEXT |
|---|---|---|---|---|
| AL1 | FIC100 | 100 | High | COMMUNICATION ERROR |
| AL2 | FIC200 | 200 | Low | RECOVERED FROM ERROR |
| AL3 | FIC300 | 300 | Mid | PARTLY BROKEN DOWN |

FIG. 3

FILTER CONDITION DEFINING FILE

| FILTER CONDITION | if | then |
|---|---|---|
| F1 | SIGNIFICANCE = INFO | stop |
| F2 | FIC200 | SIGNIFICANCE = LOW |
| F3 | FIC100 OR FIC200 | SIGNIFICANCE = HIGH, S1: NOTIFY TO MR.** |
| F4 | FIC400 | stop |
| F5 | MESSAGE TYPE = 200 | SIGNIFICANCE = MID, S2: CHECK LINE** |
| F6 | MESSAGE TYPE = 100 | stop |

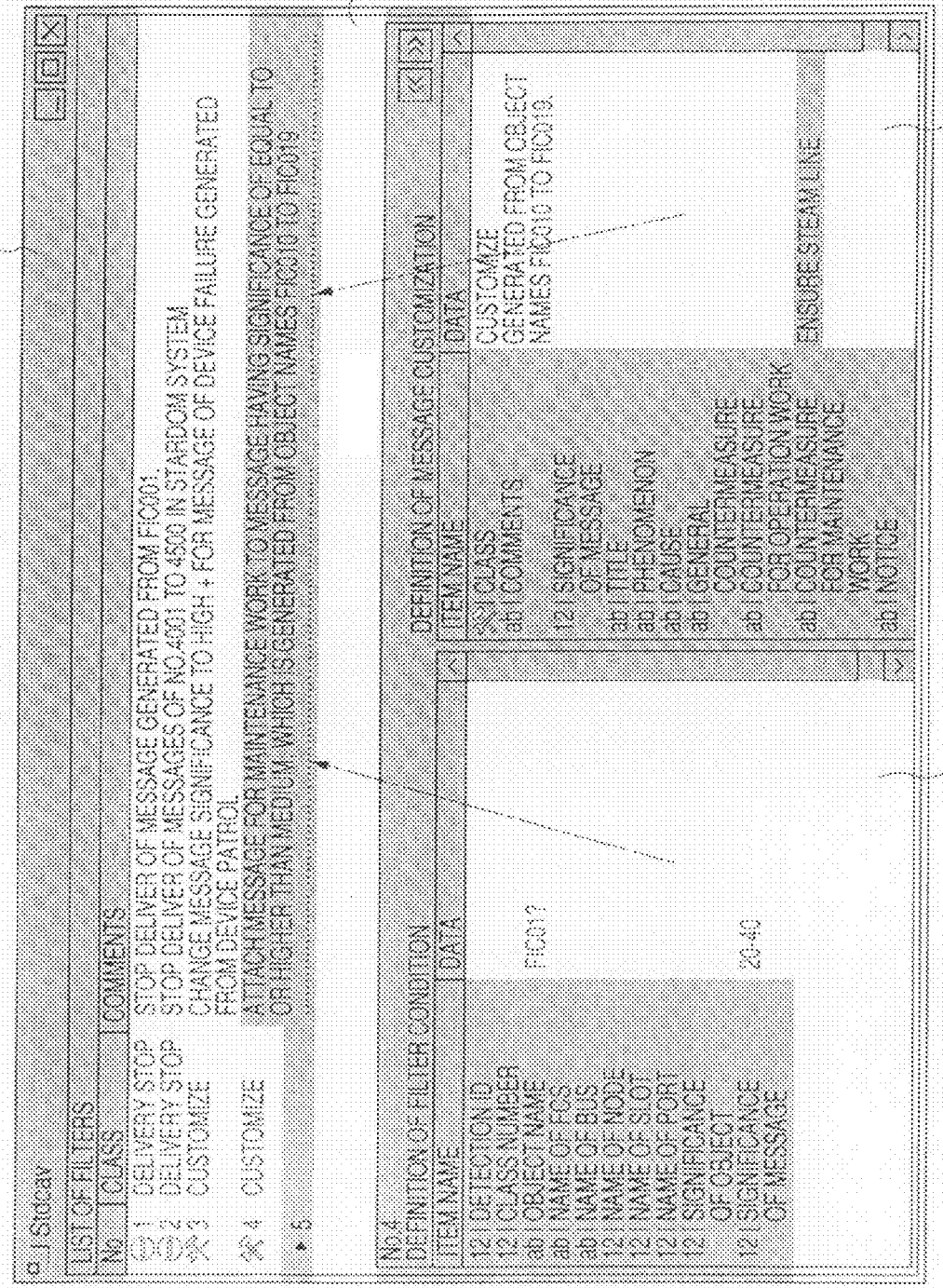

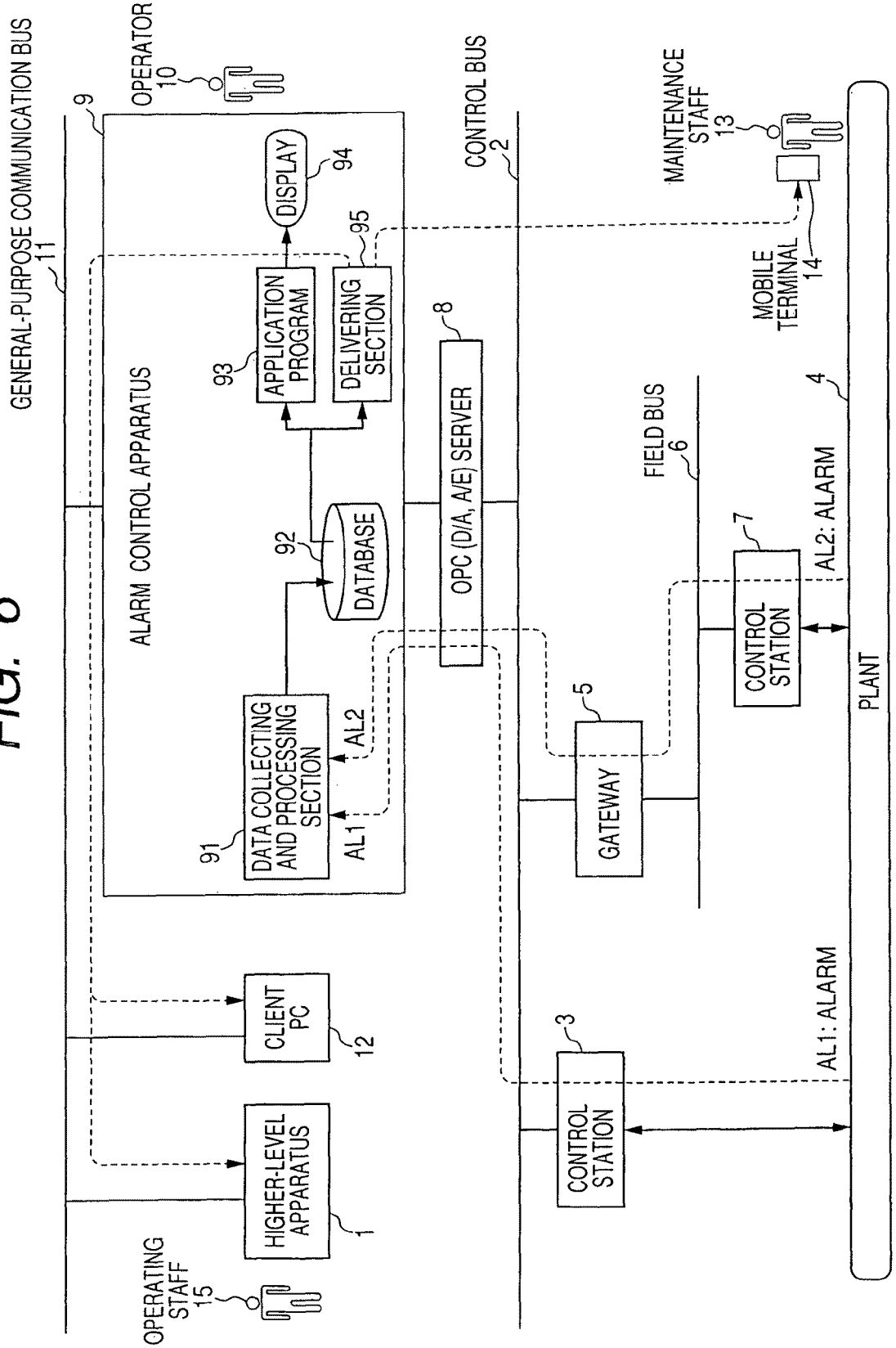

ALARM CONTROL APPARATUS

This application claims foreign priority based on Japanese Patent application No. 2005-138582, filed May 11, 2005, the content of which is incorporated herein by reference in its entirety.

BACKGROUND OF THE INVENTION

1. Field of the Invention

The present invention relates to an alarm control apparatus which collects alarms from a plant and handles the alarms.

2. Description of the Related Art

Because of the spread of a distributed control system (hereinafter, abbreviated as DCS) and advancement of a field bus network, recently, self-diagnostic information (a message or an alarm) notified from a field equipment of a plant can be handled on the DCS.

Therefore, alarm control, such as early detection and early response to an abnormality in a field equipment, and integrated management of detailed statuses, is available by using an alarm control apparatus which is typified by a RPM (Plant Resource Manager) connected to the DCS for communication.

FIG. 6 is a functional block diagram showing a configuration example of a DCS to which a related alarm control apparatus is connected. The reference numeral 1 denotes a higher-level apparatus which executes operating and monitoring processes in the DCS, and which is connected to a control bus 2.

The reference numeral 3 denotes a control station which is connected to the control bus 2 to communicate with the higher-level apparatus 1, and also with field equipments (not shown) placed in a plant 4 to execute a control based on an application program.

The reference numeral 5 denotes a gateway which relays communication between the control bus 2 and a field bus 6 that operates on a different standard. The reference numeral 7 denotes a control station which forms a sub system, and which communicates with the higher-level apparatus 1 via the field bus 6 and the control bus 2, and also with field equipments (not shown) placed in the plant 4 to execute a control based on an application program.

The reference numeral AL1 denotes an alarm which is sent from the plant 4 to the control bus 2 via the control station 3, and AL2 denotes an alarm which is sent from the plant 4 to the control bus 2 via the control station 7 and the gateway 5.

The reference numeral 8 denotes an OPC (OLE for Process Control) server which is connected to the control bus 2, which collects the alarms AL1, AL2, and which passes data according to the OPC standard to the alarm control apparatus 9. The reference numeral 10 denotes an operator of the alarm control apparatus 9.

The reference numeral 11 denotes a general-purpose communication bus which is typified by Ethernet (registered trademark), and which is connected to the alarm control apparatus 9 and the higher-level apparatus 1, and 12 denotes a client PC which obtains delivery information from the alarm control apparatus via the general-purpose communication bus 11.

As required, also the higher-level apparatus 1 obtains the delivery information from the alarm control apparatus 9 via the general-purpose communication bus 11. The reference numeral 13 denotes a maintenance staff who patrols and maintains the plant 4, and who obtains the delivery information from the alarm control apparatus 9 via a mobile terminal 14, and 15 denotes an operating staff who operates and monitors the higher-level apparatus 1.

In the alarm control apparatus 9, 91 denotes data collecting and processing section for collecting the alarms AL1, AL2 which are sent from the OPC server 8, for performing required data processing on the alarms, and for storing the alarms into a database 92.

The reference numeral 93 denotes an application program which reads out alarm information of a predetermined time period that is stored in the database 92, which executes a process of analyzing the cause of a fault or the like, and which shows a result of the process to the operator 10 through a display device 94.

The reference numeral 95 denotes a delivering section for reading out the alarm information stored in the database 92 on the basis of a predetermined delivery period or a delivery request, and for delivering the alarm information to the client PC 12, the mobile terminal 14 of the maintenance staff 13, and the higher-level apparatus 1.

JP-A-2005-84774 discloses an alarm control system which collects message data of alarms generated in a process, and which analyzes behaviors of the alarms.

The related alarm control apparatus have the following problems.

(1) All alarms which are generated in the plant, and each of which is indicative of an abnormal status of an equipment are to be collected. Important alarms which require immediate response are mixed with alarms of a negligible level. The operator and maintenance staffs must conduct troublesome checking operations, and hence there is a risk of overlooking an important alarm.

(2) The apparatus is not provided with customizing section for enabling the user to arbitrarily add information to alarm information generated by an equipment of the plant. Therefore, a fine-tuned delivery service is not available.

(3) It is impossible to apply a process of stopping delivery on an alarm which is not required to be delivered.

SUMMARY OF THE INVENTION

The present invention has been made in view of the above circumstances, and provides an alarm control apparatus which can deliver collected alarm information after executing a predetermined conditioning process on the alarm information.

In some implementations, an alarm control apparatus which collects alarms from a plant and handles the alarms includes:

a defining section for defining a conditioning process which is executed when performing a filtering process on the alarms; and a filtering section for performing the filtering process on the collected alarms in accordance with the conditioning process defined by the defining section.

In the alarm control apparatus of the invention, the conditioning process is customized by a user.

In the alarm control apparatus of the invention, the conditioning process is executed based on if-then rule.

In the alarm control apparatus of the invention, the conditioning process includes a stop of delivery of at least one of the alarms.

In the alarm control apparatus of the invention, the conditioning process includes a change of significance of at least one of the alarms.

In the alarm control apparatus of the invention, the conditioning process includes an attachment of a message to at least one of the alarms.

In the alarm control apparatus of the invention, the filtering section executes the conditioning process sequentially in an order of definitions defined by the defining section.

As apparent from the above description, the present invention can achieve the following effects.

(1) Because of the conditional filtering process, the significance of an alarm can be easily managed, and hence failures that the operator and maintenance staffs overlook an important alarm are reduced.

(2) Customization in which the user can arbitrarily add information to alarm information generated by an equipment of the plant is enabled. Therefore, a fine-tuned service is available.

(3) A process of stopping delivery can be applied on an alarm which is not required to be delivered.

(4) The conditioning process can be executed on the basis of a simple if-then rule.

BRIEF DESCRIPTION OF THE DRAWINGS

FIG. 2 is a table showing an example of contents of alarms AL1, AL2, AL3 which are generated in the plant and collected.

FIG. 3 is a table showing an example of contents of a filter condition defining file which is customizable.

FIG. 5 shows an example of a screen for customizing the filter condition defining file by a filter condition defining section.

FIG. 6 is a functional block diagram showing a configuration example of a DCS to which a related alarm control apparatus is connected.

DESCRIPTION OF THE PREFERRED EMBODIMENTS

Figure 1:
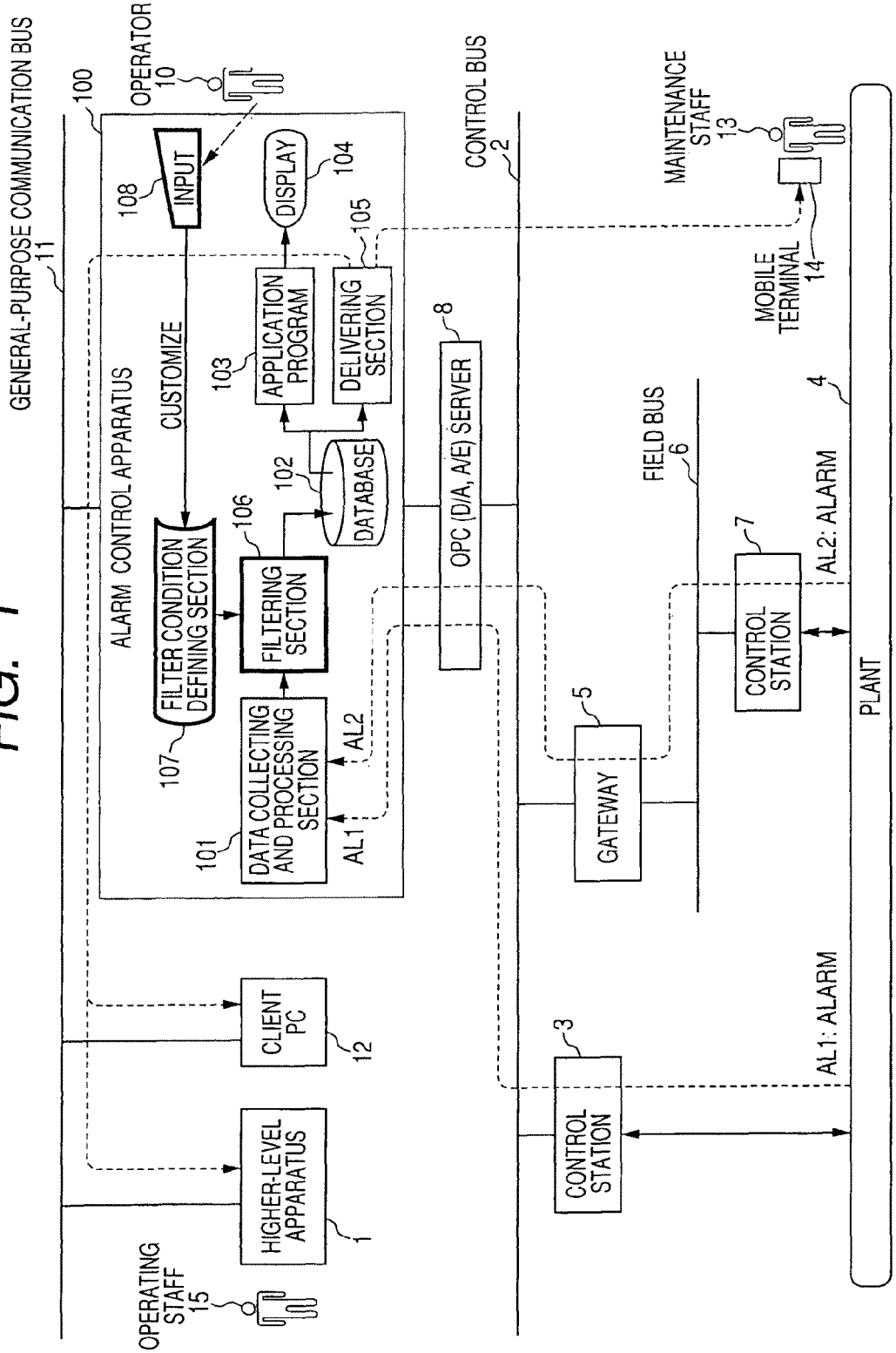
FIG. 1 is a functional block diagram showing an embodiment of a DCS to which an alarm control apparatus according to an embodiment of the invention is connected.

Hereinafter, the invention will be described in detail with reference to the accompanying drawings. FIG. 1 is a functional block diagram showing an embodiment of a DCS to which an alarm control apparatus according to an embodiment of the invention is connected. The components identical with those of the related DCS which has been described with reference to FIG. 6 are denoted by the same reference numerals, and their description is omitted. Hereinafter, the alarm control apparatus according to an embodiment of the invention will be described.

Referring to FIG. 1, 100 denotes an alarm control apparatus to which the invention is applied. A data collecting and processing section 101, a database 102, an application program 103, a display 104, and a delivering section 105 have the same functions as the components 91 to 95 of the related alarm control apparatus which has been described with reference to FIG. 6, respectively.

The reference numeral 106 denotes a filtering section which is a principal portion of the invention, which is disposed between the data collecting and processing section 101 and the database 102, and which applies a conditioning process on alarms stored in the database 102.

The reference numeral 107 denotes a filter condition defining section that has a form of a file in which conditions are defined in accordance with an if-then rule. The filtering section 106 executes a filtering process on the basis of the definition file.

The reference numeral 108 denotes input section such as a keyboard. The operator 10 can freely customize the definition contents described in the file of the filter condition defining section 107, through the input section.

The defining section corresponds to a portion configured by the filter condition defining section 107 and the input section 108.

Hereinafter, a specific example of the filtering process will be described with reference to FIGS. 2 to 4D. FIG. 2 is a table showing an example of the contents of the alarms AL1, AL2, AL3 which are generated in the plant and collected. Each of the alarms is configured by a tag name FIC100, FIC200, or FIC300, a message type 100, 200, or 300, the significance High, Low, or Mid, and the body text.

FIG. 3 is a table showing an example of the contents of the filter condition defining file which is customizable. In the example, six filter conditions F1 to F6 are defined on the basis of an if-then rule. According to the condition F1 which targets on all the alarms, if the significance is Info, then the delivery is stopped. The significance Info means a level in which the alarm is not an alarm and indicates mere information. According to the condition F2 which targets on the tag FIC200, the significance is compulsively set to Low.

According to the condition F3 which targets on the tag FIC100 or FIC200, the significance is compulsively set to High, and a message S1 is attached. According to the condition F4 which targets on a tag FIC400, the delivery is stopped. According to the condition F5 which targets on the message type 200, the significance is compulsively set to Mid, and a message S2 is attached. According to the condition F6 which targets on the message type 100, the delivery is stopped.

Figure 4A:
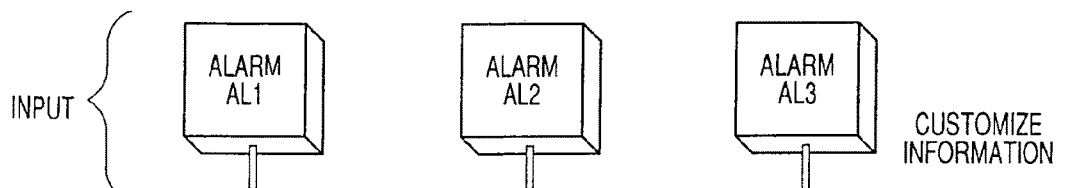
FIGS. 4A to 4D are image diagrams illustrating a flow of a process of filtering section.
Figure 4B:
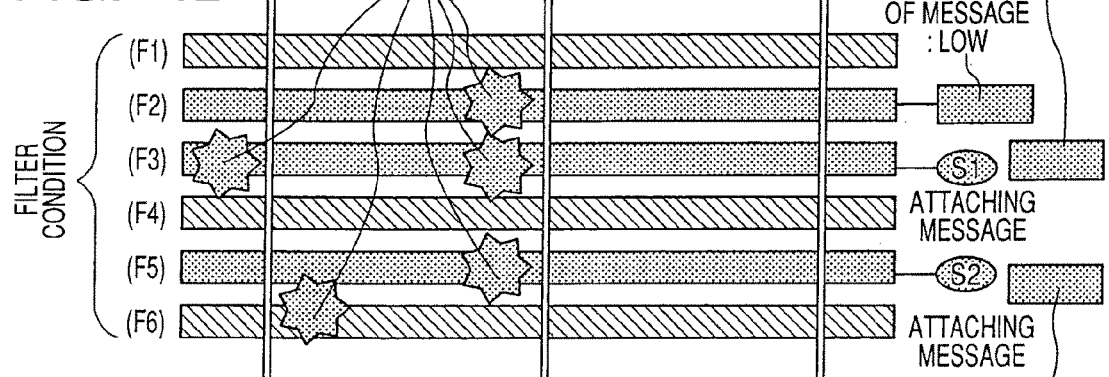

FIGS. 4A to 4D are image diagrams illustrating the flow of the process of the filtering section 106. FIG. 4A shows the input alarms AL1, AL2, AL3 having the alarm contents of FIG. 2, and FIG. 4B shows filter conditions according to which the contents of the filter condition defining file of FIG. 3 are referred and the filtering process is executed.

Figure 4C:
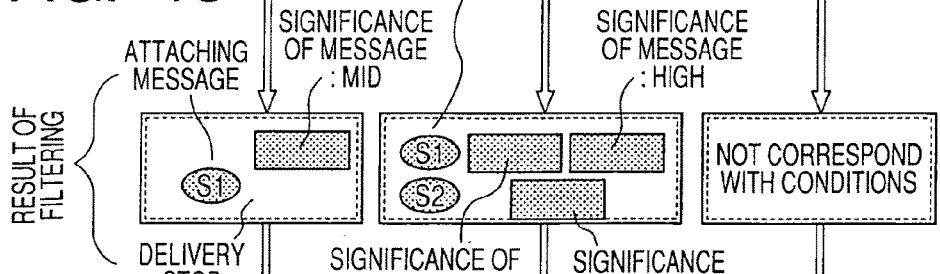
Figure 4D:
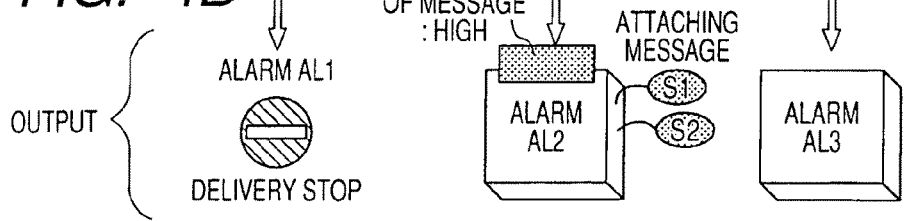

FIG. 4C shows results of the filtering process in which the contents of the input alarms AL1, AL2, AL3 correspond with one of the filter conditions F1 to F6, and (D) shows output formats of the filtering section 106 based on the filter results.

With respect to the input alarm AL1, condition correspondence is attained in the filter condition F3, and the significance High and the additional message S1 are attached, but condition correspondence is attained also in the filter condition F6, and the delivery is stopped. Therefore, the output format of the filtering section 106 is the stop of delivery.

With respect to the input alarm AL2, condition correspondence is attained in the filter conditions F2, F3, F5, and the significances High, Low, Mid and the additional messages S1, S2 are added. In the output format of the filtering section 106, however, the significance High which is the highest level, and the additional messages S1, S2 are added as customize information to the contents of the alarm AL2.

With respect to the input alarm AL3, condition correspondence is not attained by the definition contents of the filter conditions F1 to F6. Therefore, customize information is not added, and the filtering section 106 outputs the contents of the alarm AL3 as they are.

As described above, the filtering section 106 in the invention is characterized in that an alarm which agrees with even one of definitions of delivery stop as a result of the condition correspondence process is blocked and the delivery of the alarm is stopped. To a maintenance alarm which fails to correspond with the definitions of delivery stop, and which agrees with one of the customize definitions, all sets of customize information which are defined in all the agreed conditions are added.

As, among the customize definitions, a definition relating to a change of significance, the highest value which is defined in the process of filtering is used. An alarm which fails to correspond with the conditions is passed as it stands.

FIG. 5 shows an example of a screen for customizing the filter condition defining file with using the filter condition defining section 107. The contents of filter conditions which have been already defined are displayed in an upper display region 107a, and a state where condition No. 5 is being customized is currently shown.

Filtering conditions (FIC01? and significance of message 20-40: Medium) are selected in a lower left display region 107b, and messages to be added are defined in a lower right display region 107c.

In the filter condition defining file which is referred by the filtering section 106, and which is exemplarily shown in FIG. 3, plural conditions are described in an arbitrary order. Irrespective of addition or deletion due to customization, the conditioning process is executed in the description order of definitions in a time sequential manner.

The application of the above-described alarm control apparatus of the invention is not restricted to a PRM, and can be applied to a usual system which manages alarms. In the embodiment of FIG. 1, the alarm control apparatus 100 comprises the application program 103 which uses stored data. Alternatively, a usage configuration may be employed in which an application program is provided only in the side of the client PC 12, and the alarm control apparatus 100 is used as a server for alarm control data.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An alarm control apparatus which collects alarms from a plant and handles the alarms, the alarm control apparatus comprising:
    a defining section for defining a conditioning process which is executed when performing a filtering process on the alarms; and
    a filtering section for performing the filtering process on the collected alarms in accordance with the conditioning process defined by the defining section,
    wherein the conditioning process includes a stop of delivery of at least one of the alarms based only on a defined filter condition to stop delivery being met.

2. The alarm control apparatus according to claim 1, wherein the conditioning process is customized by a user.

3. The alarm control apparatus according to claim 1 wherein the conditioning process is executed based on if-then rule.

4. The alarm control apparatus according to claim 1, wherein the conditioning process includes a change of significance of at least one of the alarms.

5. The alarm control apparatus according to claim 1, wherein the conditioning process includes an attachment of a message to at least one of the alarms.

6. The alarm control apparatus according to claim 1, wherein the filtering section executes the conditioning process sequentially in an order of definitions defined by the defining section.

* * * * *